United States Patent
Ogawara

(10) Patent No.: US 10,245,725 B2
(45) Date of Patent: Apr. 2, 2019

(54) ROBOT APPARATUS AND METHOD FOR CONTROLLING ROBOT APPARATUS

(71) Applicant: CANON KABUSHIKI KAISHA, Tokyo (JP)

(72) Inventor: Takayuki Ogawara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 15/097,662

(22) Filed: Apr. 13, 2016

(65) Prior Publication Data

US 2016/0311111 A1    Oct. 27, 2016

(30) Foreign Application Priority Data

Apr. 22, 2015    (JP) ................. 2015-087294

(51) Int. Cl.
*B25J 19/00*    (2006.01)
*B25J 9/16*    (2006.01)
*B25J 13/08*    (2006.01)

(52) U.S. Cl.
CPC ........... *B25J 9/1633* (2013.01); *B25J 13/085* (2013.01); *B25J 19/0025* (2013.01)

(58) Field of Classification Search
CPC ...... G01L 5/226; G01L 5/0052; B25J 13/085; B25J 9/1633; B25J 19/06; B25J 19/0025; Y10S 901/46; G05B 2219/39319
See application file for complete search history.

(56) References Cited

U.S. PATENT DOCUMENTS

| | | | | |
|---|---|---|---|---|
| 4,507,042 A | * | 3/1985 | Suzuki | B23K 9/287 248/201 |
| 6,725,734 B1 | * | 4/2004 | Toratani | B62D 6/10 73/862 |
| 2002/0056181 A1 | * | 5/2002 | Sakakibara | B25J 9/1633 29/407.01 |
| 2005/0199601 A1 | * | 9/2005 | Inoue | B25J 19/0025 219/125.1 |
| 2010/0109360 A1 | * | 5/2010 | Meisho | B23P 19/105 294/86.4 |
| 2010/0332030 A1 | * | 12/2010 | Larkin | G01L 5/226 700/245 |
| 2012/0296472 A1 | * | 11/2012 | Nagai | B25J 9/1612 700/258 |

(Continued)

FOREIGN PATENT DOCUMENTS

JP    2012-218104 A    11/2012

*Primary Examiner* — Stephen Holwerda
(74) *Attorney, Agent, or Firm* — Venable LLP

(57) ABSTRACT

A robot apparatus determines a reactive force of a wire member by a sensor, used for the transmission of a driving signal between the robot apparatus and a joint (or end effector). The robot apparatus includes: a plurality of links which constitute a robot arm; rotational joints which connect each of the links to each other; a motor which drives each of the rotational joints; and a cable as a wire member, which is arranged along each link and transmits a driving signal at least to a driving source. A controlling apparatus drives and controls the motor which drives the rotational joints, based on a value of a reactive force, which a cable reactive force measuring unit outputs, which measures the reactive force to be applied to a joint portion when the cable is deformed.

10 Claims, 7 Drawing Sheets

(56) References Cited

U.S. PATENT DOCUMENTS

2015/0258690 A1* 9/2015 Naitou .................... G01L 5/226
　　　　　　　　　　　　　　　　　　　　　　　700/253
2015/0273692 A1　10/2015　Ogawara

* cited by examiner

ROBOT APPARATUS AND METHOD FOR CONTROLLING ROBOT APPARATUS

BACKGROUND OF THE INVENTION

Field of the Invention

The present invention relates to a robot apparatus in which a wire member that transmits a driving signal and/or a control signal to each unit of a robot arm therethrough is arranged along a plurality of links which constitute a robot arm; and a method for controlling the same.

Description of the Related Art

In recent years, in a robot apparatus, for instance, in a multi-axis and multi-joint robot in which a joint is rotated and constrained, a multi-joint robot has received attention which arranges a torque sensor for measuring a torque that a driving source exerts on a link, in a joint, and controls the torque (force) which occurs in the joint. By arranging the torque sensor in the joint, it has become easy for the multi-joint robot to control the force occurring in the joint thereof and to control a load and/or a force which an end effector arranged in the front end of the robot arm exerts on a component.

For the present, the robot apparatus that has the torque sensor and can control the torque is often used for the assembly in which a load of several hundreds to several kilograms is exerted on a component, such as an assembly of an engine part of an automobile. On the other hand, the robot apparatus is not used so often for an assembly of such a very light load that the load or the force to be exerted on the component at the time of assembly is approximately several grams, for instance, for an operation of a tiny component of several grams, a film, a sheet and the like. One of the reasons is in such a point that the present multi-joint robot does not control the force (torque) with so high precision, and still cannot attain a sufficient precision range to carry out an assembly of such a range that a load which an end effector of the front end of the robot arm exerts on a component is approximately several grams.

For instance, a robot apparatus needs a transmission member for transmitting a driving signal, for controlling an actuator that drives the joint, between each of the units of the robot arm, for instance, between the actuators. These driving signals include electric signals belonging to a category of control information such as a control signal, and in addition, signals belonging to a category of a driving energy such as a driving electric power and a pressure signal of an oil pressure and/or an air pressure. In the present specification, the above-described signal such as the electric signal and the pressure signal for transmitting the control information and the driving energy, and a signal for controlling the actuator of each of the units of the robot arm are referred to as the "driving signal".

In a robot which uses, for instance, a rotational driving source such as a motor, as a driving source (actuator) that drives the joint and the end effector, a wire member such as an electric wire (cable) is used as a transmission member which transmits the control signal and the driving power to this motor and the driving circuit. In addition, when the robot uses the actuator which uses the oil pressure, the air pressure and the like for driving the joint and the end effector, a wire member like a pressure pipe which is structured of a flexible material, for instance, such as rubber, is occasionally used as the transmission member, in order to transmit the driving signal (energy).

In addition, as for the wire member of the cable and the pressure pipe as described in the above, there are many structures in which only one wire is not laid, but a wire member having a harness structure is laid, in which wire members, for instance, corresponding to a plurality of joints of the robot arm are bundled. In addition, such a harness occasionally accommodates wire members therein for an encoder which detects the operation of the actuator that drives the joint, and for feeding a signal of the above-described torque sensor back to a control system. In addition, a gripping apparatus, for instance, a hand or a gripper which acts as the end effector (or tool) is occasionally mounted on the front end of the robot arm. It is necessary to input/output (transmit) the above-described driving signal also to such an end effector (or tool). In this case, the above-described harness of the wire members occasionally accommodates a wire member therein through which inputs/outputs the driving signal to/from the end effector (or tool).

The above-described wire member (or harness thereof) is laid in the inside or outside of the robot arm, and in this case, is installed so as to straddle each of the joints of the robot apparatus. Accordingly, the wire member which transmits the driving signal therethrough is deformed when the joint of the robot apparatus is rotationally operated (similarly also when being translationally operated), and generates a reactive force according to the deformation.

On the other hand, when the torque (force) sensor is provided on the joint which supports the link (or end effector unit) and the torque (force) is controlled, as in the above description, it is desirable to measure fundamentally only the torque occurring in the joint with the torque sensor, and to feed the measured torque back to the torque control system. However, the reactive force which is generated by the deformation of the wire member that transmits the driving signal to the above-described joint (and/or end effector) which is associated with the operation of the robot apparatus gives influence on a measured value of the torque sensor that is arranged in the joint, as a measurement error.

The reactive force generated when the harness of the wire members of various cables and pressure pipes is deformed results in becoming a unit of several hundred grams, though varying depending on the structure and the scale of the robot apparatus. Accordingly, when the force (or torque) is controlled with a precision of several grams, there are problems that such a reactive force becomes an extremely large disturbance, and gives influence on the precision of the control.

With respect to the above-described problem, in order to enhance force controllability, for instance, a constitution is proposed (see Japanese Patent Application Laid-Open No. 2012-218104.) that includes: previously preparing a relationship between a rotation angle of the joint and a cable reactive force, which has been measured beforehand, as a table; estimating a force occurring in the joint of the robot apparatus; and controlling each of the joints.

However, in the above-described Japanese Patent Application Laid-Open No. 2012-218104, a table of the cable reactive force is formed and used which has been measured beforehand, and accordingly the cable installed in the actual robot apparatus does not necessarily generate the reactive force as shown in the table, in regard to a particular joint action. This is because the deformation of the wire member, for instance, such as the cable does not show reproducibility, and because of this, probably, the reactive force generated by the deformation also does not show reproducibility. Secondly, the wire member cannot be always arranged in the state equivalent to that in the preliminary measurement, and the same reactive force is not actually generated by the same joint action as in the preliminary measurement, because of such a problem of installation precision.

Accordingly, in the technology of Japanese Patent Application Laid-Open No. 2012-218104, the reactive force of the wire member is considered in the control, but still there is a problem that the force (torque) cannot be controlled with sufficient precision. In the conveyance of an article and an assembly of an article having a weight of several kilograms, such lowering of a control performance of an infinitesimal force as described above does not cause the problem, but when a component having a very light weight of several grams is assembled through a force control, the lowering of force controllability originating in the cable reactive force becomes unable to be neglected. When a range of loads which a robot deals with is large, there is a possibility that the technology of Japanese Patent Application Laid-Open No. 2012-218104 can be practically used. However, in the control for the force (torque) particularly of the order of several grams as has been described above, even the technology in Japanese Patent Application Laid-Open No. 2012-218104 cannot attain a sufficient precision, and there is a possibility of showing lowered force controllability.

The reason why a general-purpose multi-joint robot apparatus has not been conventionally positively used for the assembly of a very light load is attributable to the problem as described above. In addition, in the assembly of an article having a very light weight of several grams, the apparatus has been conventionally used, instead of the robot apparatus, which has a special structure, has a size and a precision range that are sufficiently controlled and is manufactured only for the assembly, in many cases.

On the other hand, it is also anticipated that the manufacture of many industrial products is directed toward the manufacturing of a wide variety of products in small quantities, in future. Then, a circumstance that the dedicated apparatus as described above becomes separately necessary for each of tiny (minute) components can become a significant bottleneck in regard to the achievement of the manufacturing of the wide variety of products in small quantities. If a large number of the tiny (minute) components necessary for the manufacturing of the wide variety of products in small quantities each need the design and manufacture of the above-described dedicated apparatus, such problems possibly occur that a start-up period of a production line is prolonged and a start-up cost increases, because of the necessity.

Then, it is considered that if the general-purpose multi-joint robot apparatus can control the force (torque) with sufficient high precision in consideration of the reactive force of the wire member, the dedicated apparatus is not needed, and the robot apparatus can manufacture a wide variety of products in small quantities with high efficiency in a short period.

SUMMARY OF THE INVENTION

An object of the present invention is to measure a reactive force of a wire member which is used for the transmission of a driving signal between a robot apparatus and a joint (or end effector) thereof, and to enable the robot apparatus to control the robot with high precision by using the measured value.

According to an aspect of the present invention, a robot apparatus is provided with a plurality of links which constitute a robot arm, a joint which connect the links to each other, a driving source which drives the joint, a wire member which is arranged along the link and transmits a driving signal at least to the driving source, and a controlling apparatus which controls the driving source, comprising a sensor for determining a reactive force to be applied to the joint by the wire member when the wire member is deformed, wherein the controlling apparatus drives and controls the driving source which drives the joint, based on a value of the reactive force, which the sensor outputs.

The robot apparatus according to the present invention determines a reactive force of a wire member, which is applied to a joint when the wire member that transmits a driving signal therethrough is deformed, by a sensor, and drives and controls the above-described driving source that drives the joint, based on the determined value of the reactive force. Thereby, the robot apparatus can measure or estimate a force, for instance, occurring in the joint thereof with high precision, and can control the joint of the robot apparatus with high precision. For instance, when controlling a torque (force) to be applied to a work or a link by using the sensor for determining the torque, the robot apparatus can perform a computation of removing the reactive force of the wire member, which acts as the disturbance, from the output of the sensor for determining the torque, and the like, and can precisely control the torque (force), based on a precise torque detection. Thereby, for instance, the robot apparatus having a general-purpose structure can precisely control the force of the joint, and can achieve the assembly of a component having a small weight of approximately several grams. For this reason, the robot apparatus having the general-purpose structure can be used in a production line which assembles the component having the very light weight, does not need the dedicated apparatus, a manual operation by human power and the like, can reduce the design and the manufacture cost of the dedicated apparatus, and can reduce a manufacturing period. In addition, the robot apparatus can reduce a start-up cost of a production line of assembling the minute components.

Further features of the present invention will become apparent from the following description of exemplary embodiments with reference to the attached drawings.

DESCRIPTION OF THE EMBODIMENTS

Embodiments for carrying out the present invention will be described below with reference to exemplary embodiments which are illustrated in the attached drawings. Incidentally, the exemplary embodiments which will be described below are just a few examples, and those skilled in the art can appropriately modify, for instance, a detailed configuration, in such a range as not to deviate from the scope of the present invention. In addition, numeric values taken up in the present embodiment are reference numeric values, and do not limit the present invention.

Exemplary Embodiment 1

(Basic Structure of Robot Apparatus)

Figure 1A:
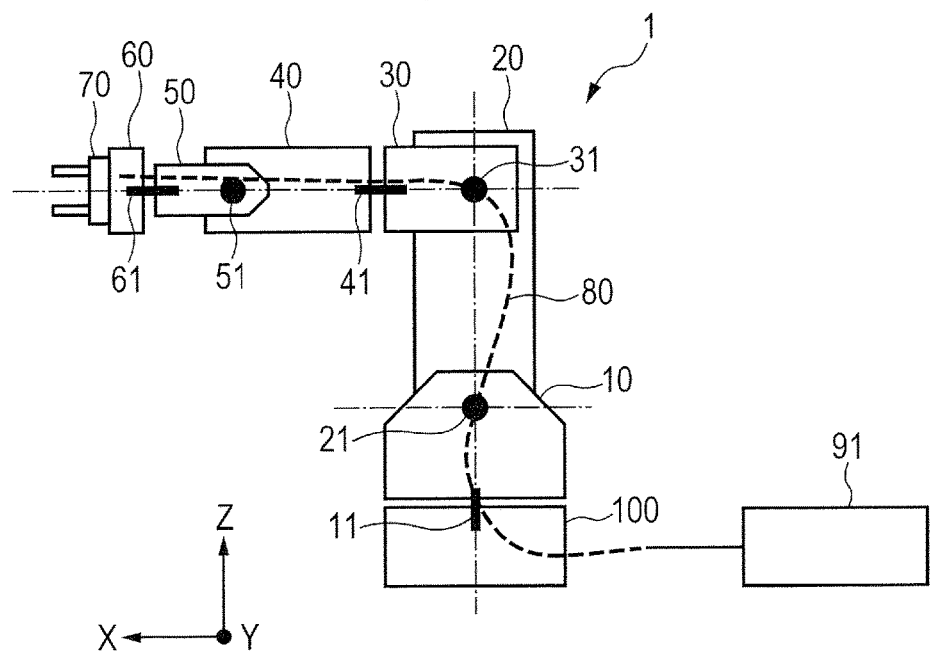
FIG. 1A and FIG. 1B are explanatory views illustrating a front view and a side view of a robot apparatus of Exemplary Embodiment 1.
Figure 1B:
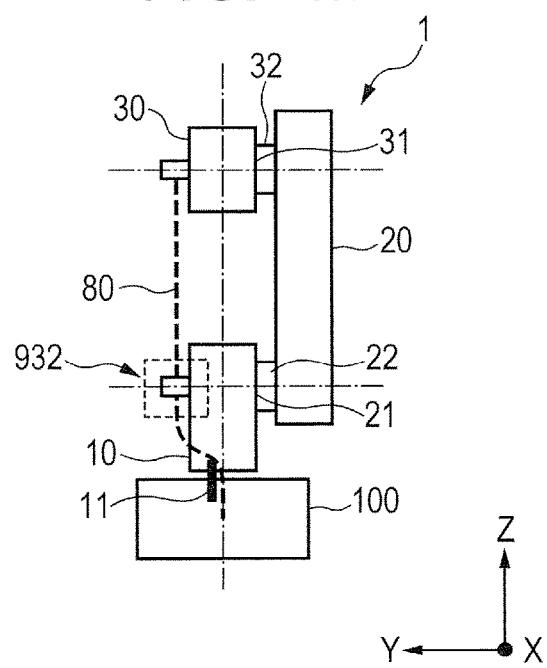

FIG. 1A and FIG. 1B are views illustrating a whole structure of a multi-joint robot apparatus, as one example of a robot apparatus which has adopted the present invention. FIG. 1A is a view illustrating the robot apparatus of the present exemplary embodiment which is viewed, for instance, from a side face. FIG. 1A illustrates coordinates of a three-dimensional (XYZ) coordinate system which is used for control of this robot apparatus, in the lower left part thereof. As is illustrated in FIG. 1A, a Z-axis among these coordinates is arranged so as to point upward in FIG. 1A, and an X-axis is arranged so as to point the left direction in FIG. 1A. FIG. 1B is a view illustrating a robot arm 1 of the robot apparatus of the present exemplary embodiment, which is viewed, for instance, from the rear part (left part in FIG. 1A). FIG. 1B illustrates also similar coordinates of the three-dimensional (XYZ) coordinate system, in the lower right part thereof. The position and orientation of the robot arm 1 illustrated in FIG. 1A are, for instance, determined to be the initial position and orientation.

Figure 4:
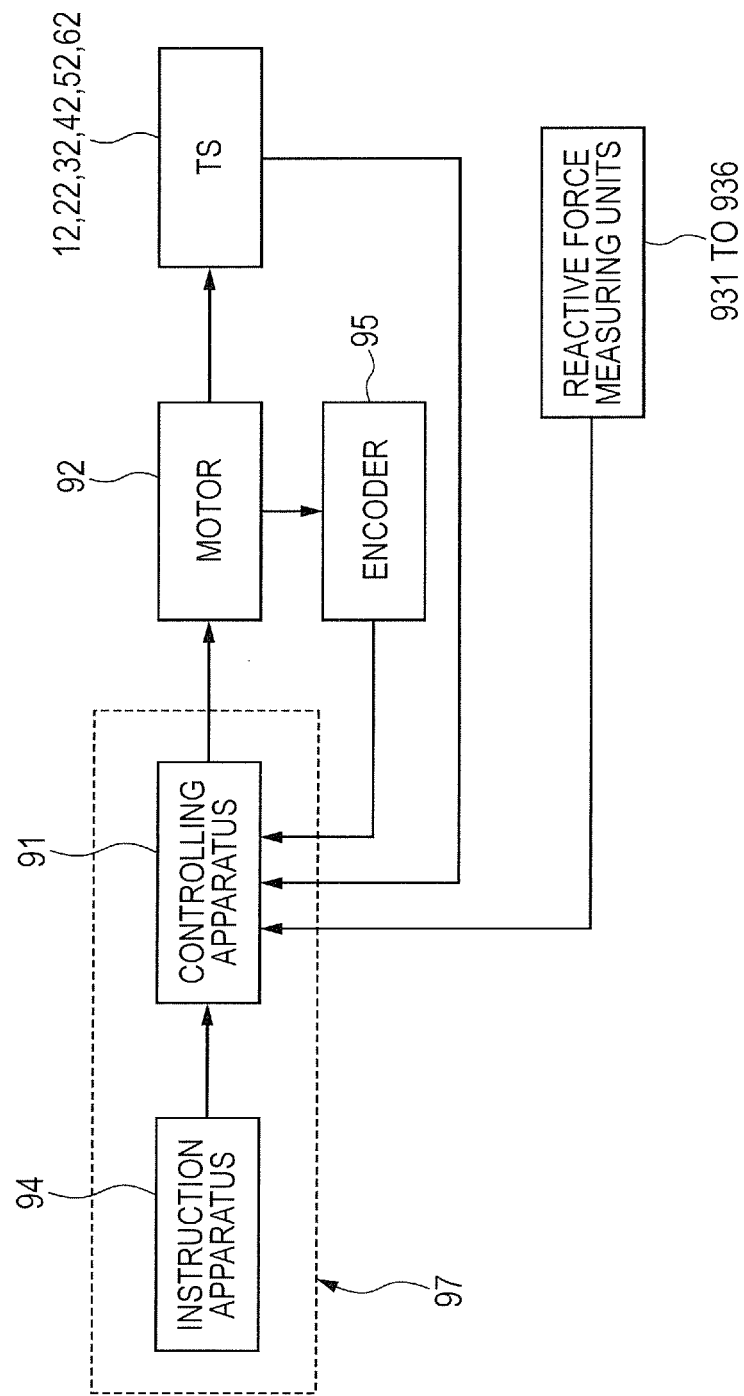
FIG. 4 is a block diagram illustrating a configuration of a control system in the robot apparatus of Exemplary Embodiment 1.

As is illustrated in FIG. 1A, the robot apparatus includes the robot arm 1 (main body of robot), and a controlling apparatus 91 which controls the robot arm 1. For more in detail, as is illustrated in FIG. 4, an instruction apparatus 94 is connected to the controlling apparatus 91, and a control system 97 of the robot arm 1 (main body of robot) is structured by these controlling apparatus 91 and instruction apparatus 94. The instruction apparatus 94 is a teaching apparatus such as a teaching pendant, for instance.

The instruction apparatus 94 has an operation unit arranged therein which includes an operation key, for instance, for moving the position and the orientation (position and angle) of the joint of the robot arm 1, a position of a reference position set at the front end or the like of the robot arm 1, or the like. When a certain robot operation is performed in the operation unit of the instruction apparatus 94, the controlling apparatus 91 controls the operation of the robot arm 1 through a cable 80 (wire member) and through the operation according to the operation of the instruction apparatus 94. On this occasion, the controlling apparatus 91 executes the robot control program which contains a control program that will be described later, and thereby controls each unit of the robot arm 1.

The robot arm 1 illustrated in FIG. 1A and FIG. 1B is a robot arm having a structure in which a plurality of links are connected to each other through a plurality of joints (six axes), in a serial link form, for instance. An end effector 70 is connected to a link 60 in the front end of the robot arm 1.

Links 10, 20, 30, 40, 50 and 60 of the robot arm 1 are connected to each other through each of the joints which are, for instance, rotational joints 11, 21, 31, 41, 51 and 61 in the present exemplary embodiment, in the following way.

A base 100 (base part) and the link 10 of the robot arm 1 are connected to each other by the rotational joint 11 which rotates around a rotating axis of a Z-axis direction. The rotational joint 11 shall have a movable range, for instance, of approximately ±180 degrees from the initial position and orientation. The link 10 and the link 20 of the robot arm 1 are connected to each other by the rotational joint 21. A rotating axis of the rotational joint 21 is aligned in a Y-axis direction in the illustrated state. This rotational joint 21 shall have a movable range, for instance, of approximately ±80 degrees from the initial position and orientation.

The link 20 and the link 30 of the robot arm 1 are connected to each other by the rotational joint 31. A rotating axis of this rotational joint 31 is aligned in the Y-axis direction in the illustrated state. The rotational joint 31 shall have a movable range, for instance, of approximately ±70 degrees from the initial position and orientation. The link 30 and the link 40 of the robot arm 1 are connected to each other by the rotational joint 41. A rotating axis of this rotational joint 41 is aligned in an X-axis direction in the illustrated state. The rotational joint 41 shall have a movable range, for instance, of approximately ±180 degrees from the initial position and orientation.

The link 40 and the link 50 of the robot arm 1 are connected to each other by the rotational joint 51. A rotating axis of the rotational joint 51 is aligned in the Y-axis direction in the illustrated state. This rotational joint 51 shall have a movable range, for instance, of approximately ±120 degrees from the initial position and orientation. The link 50 and the link 60 of the robot arm 1 are connected to each other by the rotational joint 61. A rotating axis of the rotational joint 61 is aligned in the X-axis direction in the illustrated state. This rotational joint 61 shall have a movable range, for instance, of approximately ±240 degrees from the initial position and orientation.

As has been described above, in the present exemplary embodiment, the rotating axes of the rotational joints 11, 41 and 61 are arranged in parallel (or coaxial) to the central axes (dashed lines) of the two links which are connected to each other, so as to be capable of changing the (relative) angle between the two links around the rotating axis of the two links. On the other hand, the rotating axes of the rotational joints 21, 31 and 51 are arranged so as to be capable of changing the (relative) angle at which the central axes (dashed lines) of the two links intersect that are connected by the rotational joints to each other.

In addition, the end effector 70 such as an (electric) hand and a (pneumatically-driven) air hand for performing an assembly work and a moving work in a production line is connected to the front end of the link 60 of the robot arm 1. This end effector 70 can be mounted on the link 60 with a (semi-) fixable unit (unillustrated) such as screw fastening, or can be mounted thereon with an attachable/detachable unit (unillustrated) such as latch (ratchet) fastening. In particular, when the end effector 70 is attachable/detachable, such a method is also considered as to control the robot arm 1 and attach/detach or exchange the end effector which has been arranged in a supply position (unillustrated), by the action of the robot itself.

(Cable Path)

The rotational joints 11 to 61 or the end effector 70 of the robot arm 1 in FIG. 1A and FIG. 1B are driven, for instance, by an electric rotational driving source, for instance, a motor (reference numeral 92 in FIG. 4, which will be described later). In this case, in the rotational joint, a speed reducer is occasionally used which uses a wave-motion gear mechanism and the like, in addition to the motor. In addition, in the end effector such as the hand or the gripper, a speed reducing or driving direction converting mechanism such as rack & pinion is occasionally used. The motors which drive the rotational joints 11 to 61 (or end effector 70) are arranged at predetermined positions in the inside of the rotational joints (or end effector 70), respectively. Incidentally, in the present exemplary embodiment, these motors shall be arranged each in the inside of the joint, but the motors (or speed reducers) may be arranged each in the outside of the joint.

When the driving units of the rotational joints 11 to 61 are such motors, a wire member such as an (electric or signal) cable is necessary as a transmission unit for transmitting energy (driving power) for driving each of the motors or transmitting a control signal.

In addition, the case is also considered where the driving units of the rotational joints 11 to 61 and the end effector 70 are each structured of a pressure mechanism which uses an oil (liquid) pressure or an air pressure. In this case, driving energy and/or a control signal which are formed of the pressure signal needs to be transmitted to each of these units of the robot arm 1, specifically, to the rotational joints 11 to 61 and the end effector 70. In this case, a wire member such as a flexible pressure tube can be used as the transmission unit for transmitting the driving energy or the control signal.

In the present exemplary embodiment, in order to facilitate description, the driving unit of each of the rotational joints 11 to 61 (or end effector 70) shall be the motor, and accordingly the wire member which acts as the transmission unit for transmitting the driving energy or the control signal to each of these units shall be the (electric) cable 80. This cable 80 shall have a so-called wire harness (bundle wire) structure that is formed of a plurality of wire members which are each connected, for instance, between the controlling apparatus 91 and each of the rotational joints (or end effector 70).

This wiring (routing) path of the cable 80 is illustrated by the dashed line in FIG. 1A and FIG. 1B. The cable 80 (or harness thereof) is arranged in the inside and the outside of the arm, and is fixed (or semi-fixed) at arbitrary places so that the cables 80 of the base 100 and each of the links 10 to 60 do not disturb the operation of the robot arm 1 or interfere with the peripheral apparatus.

For instance, in the present exemplary embodiment, the cable 80 is fixed (or semi-fixed) by a fixing member (for instance, cable fixing member 81 which will be described later) at a position approximately on a rotating axis of the rotational joint 21 (31), as is illustrated in FIG. 1B.

Incidentally, the case is also considered where the cable 80 (or wire harness thereof) is arranged in the base 100 and an inner space of each of the links 10 to 60, but also in this case, a structure and control of using a sensor for determining the reactive force at the time when the wire member is deformed, which will be described later, can be similarly carried out.

(Arrangement of Torque Sensor)

The robot apparatus in the present exemplary embodiment is structured so as to arrange the sensor for determining the reactive force therein at the time when the cable 80 is deformed, and be capable of making the detected result reflected on the driving control particularly of the rotational joints 11 to 61. For instance, in the case of the rotational joint 21 of the robot arm 1, a sensor 22 (that is occasionally referred to as a torque sensor or a second sensor in the present specification) is provided (FIG. 1B) which functions for determining a driving torque of the motor (unillustrated) that drives the rotational joint 21, in other words, a rotational driving force that is applied to the link 20 from this motor. This torque sensor 22 is arranged at a predetermined position, for instance, on the driving axis of the driving system which is formed of the motor that is arranged in the inside of the rotational joint 21, or further of a speed reducer.

Incidentally, the details of the structure and the arranged position of the torque sensor 22 are unillustrated, but a well-known structure may be used for such a torque sensor 22 which measures the rotational driving force of the rotational joint. In addition, torque sensors 12, 32, 42, 52 and 62 (FIG. 4) which are similar to the torque sensor 22 shall be arranged also in other rotational joints 11, 31, 41, 51 and 61.

In addition, in the present exemplary embodiment, a cable reactive force measuring unit 932 is arranged in the same rotational joint 21, as is illustrated in FIG. 1B. The structure example of this cable reactive force measuring unit 932 will be described later with reference to FIG. 2.

FIG. 1B illustrates only (position of) the torque sensor 22 which is provided on the rotational joint 21, and the cable reactive force measuring unit 932. However, the torque sensor which is similar to the torque sensor 22 for measuring the similar rotational driving force of the joint can be provided also in other rotational joints 11, 41, 51 and 61. In addition, also as for the cable reactive force measuring unit, a cable reactive force measuring device which is similar to the cable reactive force measuring unit 932 can be provided in other rotational joints 11, 41, 51 and 61.

The torque sensor 22 for measuring the rotational driving force of the rotational joint 21 is arranged at a predetermined position on a driving axis of a driving system which is formed of a motor that drives the rotational joint 21, or further of a speed reducer and the like, as has been described above. In addition, as has been described above, in such a structure that the cable 80 is (semi-) fixed, for instance, on the axis of the rotational joint 21, when the rotational joint 21 is driven by the motor and the angle is changed, the cable 80 results in being deformed in both sides of the rotational joint 21.

Accordingly, the torque sensor 22 for measuring the rotational driving force of the rotational joint 21 results in actually detecting a torque which is a combined force of the reactive force at the time when this cable 80 is deformed, and the rotational driving force of the motor which drives the rotational joint 21.

Then, in the present exemplary embodiment, the cable reactive force measuring unit 932 is provided on the rotational joint 21, which detects the reactive force at the time when the cable 80 is deformed. The robot apparatus can correct the drive control, for instance, of feeding the output of the torque sensor 22 back to the driving of the rotational joint 21, by using the output of this cable reactive force measuring unit 932 (FIG. 7 and FIG. 8 which will be described later).

(Structure of Force Sensor)

Figure 2:
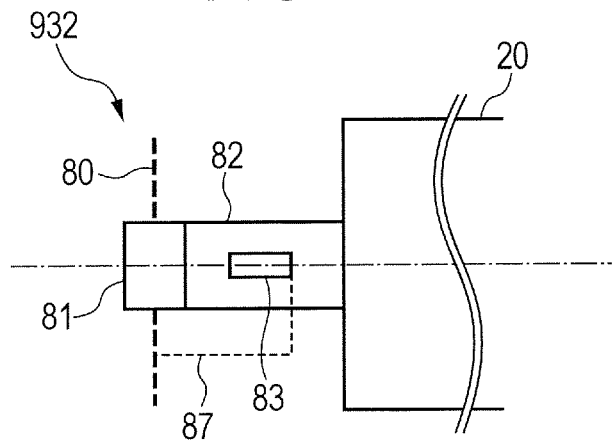
FIG. 2 is an explanatory view illustrating a structure of a cable reactive force measuring unit in the robot apparatus of Exemplary Embodiment 1.

FIG. 2 illustrates a structure example of the cable reactive force measuring unit 932 which is provided on the rotational joint 21.

In FIG. 2, mechanically, the cable reactive force measuring unit 932 is structured of a cable fixing member 81 which fixes the cable 80 to the link 10, and a deformation member 82 which receives the reactive force of the cable 80 and is deformed. The illustration of the detail of the structure of the cable fixing member 81 is omitted, but the cable fixing member 81 can be structured, for instance, of a discoid member which is formed of two divided metal or resin. In this case, such grooves are provided on opposing faces of the inside of the two divided members of the cable fixing member 81 as to be capable of sandwiching (or guiding) the cable 80 at the illustrated position, and positioning the cable 80 there.

The cable fixing member 81 may fixedly position the particular site of the cable 80, or may have such a structure as to semi-fixedly guide the cable 80 simply by the above-described grooves (or open hole). In any case, when the rotational joint 21 is driven and the angle is changed, the cable 80 results in being deformed, and the reactive force acts around the pivot of the rotational joint 21. Because of this, the torque sensor 22 which is arranged on the rotational joint 21 results in detecting a combined force of the reactive force at the time when this cable 80 is deformed and the driving torque of the rotational joint 21.

On the other hand, the deformation member 82 is structured of an elastic member which is formed of a resin or the like and is elastically deformable. The deformation member 82 is structured so as to hold the cable fixing member 81 on the rotating axis of the rotational joint 21, and because of this, results in being torsionally deformed at the position of the rotational joint 21, according to the reactive force at the time when the above-described cable 80 is deformed. In order to detect the deformation amount of this deformation member 82, in the present exemplary embodiment, a sensor 83 which measures the deformation amount of the deformation member 82 is mounted on a predetermined site (for instance, surface) of the deformation member 82. This sensor 83 can be structured, for instance, of a detection element such as a distortion gauge.

The output of the sensor 83, in other words, the output of the cable reactive force measuring unit 932 is transmitted to the controlling apparatus 91 through a signal cable 87. The signal cable 87 can be accommodated in the wire harness which constitutes the cable 80 as a part of the cable 80. Incidentally, in this case, the reactive force at the time when the cable 80 is deformed at the position of the rotational joint 21 results in containing also the component of the reactive force which is generated at the time when the signal cable 87 is deformed.

The controlling apparatus 91 can perform the robot control, in particular, the driving control of the corresponding joint, by using the measured data of the reactive force of the cable 80 (hereafter abbreviated as cable reactive force), which has been detected by the cable reactive force measuring unit (932) and has been transmitted through the signal cable 87. The controlling apparatus can correct the measured torque detected by the torque sensor 22 which is provided on the rotational joint 21, for instance, by using the cable reactive force that is generated at the position of the rotational joint 21 and has been detected by the cable reactive force measuring unit 932.

In such a technology as to control, for instance, the driving torque of the joint, which is actually generated in the rotational joint 21, to a desired value, the controlling apparatus corrects the output value of the torque sensor 22 by the output value of the cable reactive force measuring unit 932. Thereby, the controlling apparatus can eliminate the component of the cable reactive force which is contained in the output value of the torque sensor 22 as the disturbance, and enables the precise joint torque control. The detail of such a correction processing example of the driving control of the joint will be described later.

Incidentally, in the present exemplary embodiment, (deformation member 82, cable fixing member 81 and sensor 83 of) the cable reactive force measuring unit 932 are installed so as to be capable of measuring the reactive force in a torsion direction on the same axis as the rotating axis of the rotational joint, which is generated by the deformation of the cable 80. This is a requirement for correcting the output of the torque sensor 22 which is arranged so as to detect the rotational driving torque of the rotational joint, by the output of the cable reactive force measuring unit.

(Arrangement of Reactive Force Measuring Unit)

FIG. 2 illustrates only a structure of the cable reactive force measuring unit 932 concerning the rotational joint 21, but a similar structure can be arranged in other rotational joints 11, 31, 41, 51, 61 and the like, which need the fixing portion for the cable 80, as needed. Thereby, the robot apparatus can measure the cable reactive force which is generated at the position in each of the rotational joints having the fixing portion for the cable 80, and can feed the measured values back to the driving control of the corresponding rotational joints.

Figure 3:
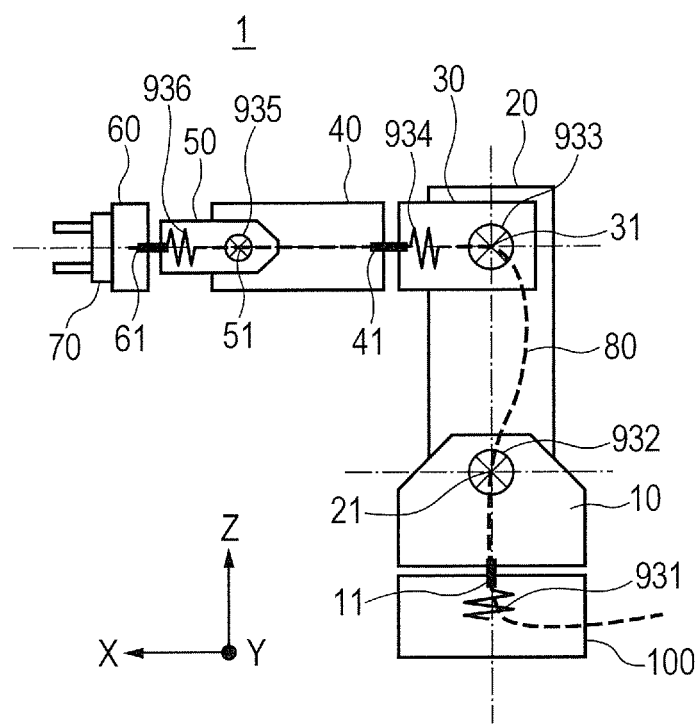
FIG. 3 is an explanatory view illustrating places at which the cable reactive force measuring units in the robot apparatus of Exemplary Embodiment 1 are installed.

FIG. 3 illustrates an arrangement example in which the cable reactive force measuring units 931, 932, 933, 934, 935 and 936 are provided on each of the rotational joints (11 to 61) of the robot arm 1. Among them, the rotational joints 31 and 51 have similar structures to that of the rotational joint 21 in which the two connected links are perpendicular to or intersect with the rotating axis of the joint. Accordingly, the cable reactive force measuring units 933 and 935 which are arranged on the rotational joints 31 and 51 can be structured similarly to the cable reactive force measuring unit 932, for instance, illustrated in FIG. 2.

On the other hand, the rotational joints 11, 41 and 61 each have the rotating axis of the joint arranged so as to be aligned in the central axes of the two connected links, and the (relative) angle between the two links around the rotating axis of the joint is controlled by the drive for each of these rotational joints. Also in such a structure, for instance, if the cable 80 is positioned at a part of the joint, when the cable 80 is deformed by the drive of the rotational joints 11, 41 and 61, the cable reactive force is generated which acts so as to rotate the link around the same axis as that of each of the rotational joints 11, 41 and 61.

The cable reactive force measuring units 931, 934 and 936 which are provided on the rotational joints 11, 41 and 61 that are coaxial with the links on both sides also each need to measure the reactive force of the cable that is twisted in the same direction on the rotating axis which is coaxial with the rotating direction of an (unillustrated) torque sensor that detects the driving torque of each of these rotational joints. Because of this, also in regard to the cable reactive force measuring units 931, 934 and 936, similarly to the cable reactive force measuring unit 932 in FIG. 2, the deformation member corresponding to the deformation member 82 in FIG. 2 is installed so as to be torsionally deformed by receiving the cable reactive force on the same axis as the rotating axis of these rotational joints.

As for a suitable structure for the purpose, for instance, in each of the rotational joints 11, 41 and 61 that are coaxial with the links, the cable 80 shall be arranged so as to penetrate the inside thereof, and the cable reactive force measuring units 931, 934 and 936 are each arranged in the inside of any one of the connected links. In this case, for instance, a structure formed of the cable fixing member 81, the deformation member 82 and the sensor 83 illustrated in FIG. 2 is arranged in the inside of each of the links which are connected by the rotational joints 11, 41 and 61, as each of the cable reactive force measuring units 931, 934 and 936. At this time, the deformation member 82 which has the sensor 83 arranged thereon, and the center (dashed line in FIG. 2) of the cable fixing member 81 are made to be hollow, and are each formed into a tubular shape (or toric shape); and each makes the cable 80 pass in the hollow portion. In addition, a part of the cable 80 is fixed to the cable fixing member 81. At this time, in order to fix the cable 80 to the cable fixing member 81, an arbitrary structure can be used in which a shoe member for bonding or crimping is pressed against the cable 80 from the outer periphery of the cable fixing member 81, by a screw or the like. The sensor 83 is installed on the surface, for instance, of the deformation member, at the position and orientation similar to that in FIG. 2.

In the above-described way, the cable reactive force measuring units 931, 934 and 936 can be structured which measure the cable reactive force that acts around the same axis as the joint axis of the rotational joints 11, 41 and 61, similarly to the case of the rotational joints 21, 31 and 51. The cable reactive force measuring units 931, 934 and 936 which have been structured in the above-described way can each measure the component of the cable reactive force in a direction around the same axis as the rotating axis of the rotational joint, which acts on the torque sensor that detects the rotational driving torque of each of the joints as the disturbance.

Incidentally, in the above-described cable reactive force measuring units 931 to 936 of the respective rotational joints, the cable 80 is determined to be arranged in the outside of the robot arm 1 (link) in the rotational joints 21, 31 and 51, and to be arranged in the inside of the arm (link) in the rotational joints 11, 41 and 61. Thus, the cable 80 may be arranged so as to sew the inside and the outside of the robot arm 1. In this case, the cable 80 can be arranged so that the cable 80 enters or leaves out from the inside of the link, through the open hole which has been provided in an appropriate place on the link of the robot arm 1.

(Controlling Apparatus)

FIG. 4 illustrates a configuration example of the control system of the robot apparatus in the present exemplary embodiment. In FIG. 4, the control system 97 of the robot apparatus includes the controlling apparatus 91 (FIG. 1A) and the instruction apparatus 94. The controlling apparatus 91 controls the operation of the robot arm 1 by controlling each of the following units illustrated in the right side of FIG. 4.

In FIG. 4, each of the motors which drive the above-described rotational joints 11, 21, 31, 41, 51 and 61 is illustrated by one block of the motor 92. The motor 92 is, for instance, a servo motor, and an encoder 95 which detects the rotation angle so as to control the position of the joint rotation angle is arranged together with the motor 92 of each of the rotational joints (respectively). For more in detail, the encoder 95 is arranged in the output axis of the motor 92, in the output axis of the speed reducer which reduces the rotation output, or in both of these output axes.

In addition, the above-described torque sensors 12, 22, 32, 42, 52 and 62 are each arranged in a part of a driving system (unillustrated) of each of the rotational joints, for the control (for instance, torque servo) of the rotational driving torques, for instance, of the rotational joints 11, 21 31, 41, 51 and 61. These torque sensors 12, 22, 32, 42, 52 and 62 are also illustrated by one block in FIG. 4.

Furthermore, the above-described cable reactive force measuring units 931, 932, 933, 934, 935 and 936 are arranged on the rotational joints 11, 21, 31, 41, 51 and 61. These cable reactive force measuring units 931, 932, 933, 934, 935 and 936 are also illustrated by one block in FIG. 4.

The controlling apparatus 91 detects the rotation angle (position and orientation) of each of the joints, by using the encoder 95 of each of the joints, and can control the position and orientation of the whole robot arm 1 so that the end effector 70 takes the predetermined position and orientation, for instance. In addition, the controlling apparatus 91 performs a control (for instance, PWM control) of the driving energy of the motor 92 of each of the joints, based on the driving torques of the joints which have been detected by the torque sensors 12, 22, 32, 42, 52 and 62, respectively, and thereby controls the driving torque of each of the joints at a desired value. Thereby, such a control is enabled, for instance, that when the end effector 70 operates the work, the controlling apparatus 91 controls the driving torque so that a force according to the physical properties (for instance, rigidity and strength) of the work is not applied to the work.

These position (position and orientation) controls with the use of the encoder 95 and torque controls (torque servo) with the use of the torque sensors 12, 22, 32, 42, 52 and 62 are each a publicly known control. For instance, the controlling apparatus 91 controls the motor 92 by using the rotation angle which has been previously programmed (or specified by instruction apparatus 94), or a target value of the joint driving torque, and the measured value of the encoder 95 and the torque sensors 12 to 62, for a particular rotational joint. In this case, the controlling apparatus 91 performs the control so that the measured value agrees with the target value, and thereby the robot apparatus achieves an expected robot operation.

In the present exemplary embodiment, furthermore, the measured values of the cable reactive forces which have been detected by the above-described cable reactive force measuring units 931, 932, 933, 934, 935 and 936 can be reflected on the torque controls (torque servo) which use the torque sensors 12, 22, 32, 42, 52 and 62.

As has been described above, the cable reactive force measuring units 931, 932, 933, 934, 935 and 936 can detect, (only) the cable reactive force which acts particularly around the same rotating axis as that of the torque sensor of each of the joints, as the disturbance. On the other hand, the torque sensors 12, 22, 32, 42, 52 and 62 are each arranged in a part of the driving system of each of the rotational joints, and accordingly the combined force of the driving torque of the motor 92 and the above-described cable reactive force results in being measured, because of the mechanism. Accordingly, for instance, the torque values detected with the use of the torque sensors 12, 22, 32, 42, 52 and 62 can be corrected by using the cable reactive forces which have been detected by the cable reactive force measuring units 931, 932, 933, 934, 935 and 936, respectively, as will be described later. Thereby, the disturbance component of the cable reactive force is eliminated, and the torque control (torque servo) can be precisely performed for each of the rotational joints.

Figure 9:
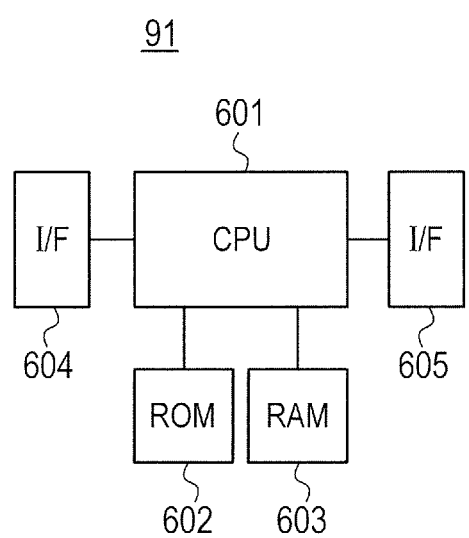
FIG. 9 is a block diagram illustrating a structure example of a controlling apparatus in the robot apparatus of Exemplary Embodiment 1.

Incidentally, for more in detail, the controlling apparatus 91 can be structured mainly of a CPU 601 using a general-purpose microprocessor, for instance, as is illustrated in FIG. 9. In FIG. 9, the controlling apparatus 91 can include, for instance, the CPU 601, a ROM 602 which stores a robot control program for controlling each of the units therein, a RAM 603 which temporarily stores data therein, and interface circuits 604 and 605.

The ROM 602 corresponds to a recording medium which stores the robot control program containing the torque control therein and can be read by a computer (CPU 601), as will be described later. The CPU 601 executes the robot control program which is stored, for instance, in the ROM 602, and thereby performs the robot control including the torque control, as will be described later.

Incidentally, a part of the ROM 602 can be structured of a rewritable nonvolatile region such as an E(E)PROM. In this case, the robot control program which has been acquired through the recording medium that can be read out by the computer, such as an unillustrated flash memory and an optical disk, or through a network, can be newly installed in the above-described rewritable nonvolatile region. In addition, the robot control program which is stored in the above-described rewritable nonvolatile region can also be updated by the above-described recording medium which can be read out by the computer, and by the data which has been acquired through the network.

The interface circuit 604 can be used for the input/output of the data between the CPU 601 and the instruction apparatus 94, for instance. In addition, the interface circuit 605 can be used for the input/output of the data between the CPU 601 and each of the above-described motor 92, encoder 95, torque sensors 12, 22, 32, 42, 52 and 62, and cable reactive force measuring units 931, 932, 933, 934, 935 and 936, for instance.

The instruction apparatus 94 which gives the operation command of the robot arm 1 has an unillustrated storage device (for instance, RAM, ROM and external storage device). In this recording device, the robot control information on the robot arm 1 shall be recorded, which is necessary for the robot apparatus to perform the assembly of a product and the like. This robot control information is described, for instance, by a plurality of teaching point data, or a format of a robot control program and the like. In addition, this storage device of the robot control information can also be structured of the RAM 603 and the ROM 602 which are not on the side of the instruction apparatus 94 but on the side of the controlling apparatus 91, or of an unillustrated external storage device (for instance, HDD or SSD).

A worker can make the robot arm 1 perform the previously-programmed operation by designating the execution (replay) of the above-described robot control information which has been previously prepared, while operating the instruction apparatus 94. In addition, when the instruction apparatus 94 is a teaching apparatus such as a teaching pendant, the worker can make the robot arm 1 interactively perform an arbitrary operation, by operating an operation key which commands the action of the joint of the instruction apparatus 94 according to a jog operation method or the like. In this case, the worker can also make the above-described storage device store the sequentially-performed operation, as the robot control information. The above-described teaching operation of the robot apparatus and a method for storing the robot control information are publicly known technologies, and accordingly the detailed description other than the above description will be omitted here.

Figure 8:
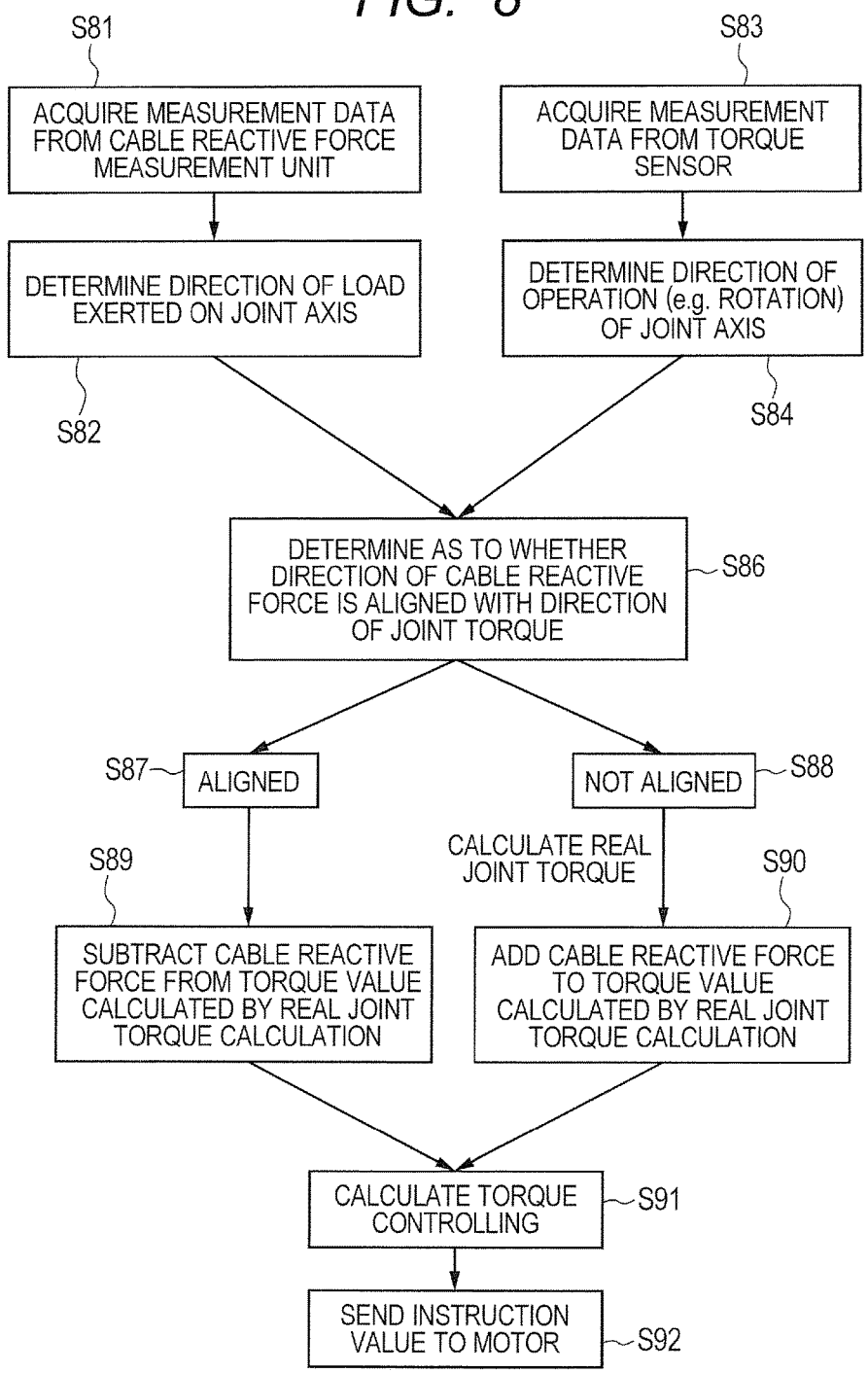
FIG. 8 is a flow chart illustrating a different robot control, in the robot apparatus of Exemplary Embodiment 2.

In the present exemplary embodiment, the controlling apparatus 91 can measure (only) the cable reactive force which behaves as a measurement error (disturbance) of each of the torque sensors 12 to 62, with the cable reactive force measuring units 931 to 936. For instance, the controlling apparatus 91 can perform a correction control which deducts the cable reactive force component that has been measured by the cable reactive force measuring units 931 to 936, from the measured value of the torque sensors 12 to 62 (FIG. 8 which will be described later). Thus, the controlling apparatus 91 can more precisely calculate an actual value of the torque which the motor 92 actually exerts on the link on the hand side of the corresponding joint through a speed reducer (unillustrated), by performing the correcting computation of deducting the component of the cable reactive force from the output value of each of the torque sensors 12 to 62. In addition, by performing a control so that the torque value obtained by eliminating the cable reactive force agrees with a target value of the torque that is generated in the joint, which has been sent from the instruction apparatus 94, the controlling apparatus 91 can more precisely perform the torque (servo) control of each of the joints of the robot arm 1. Incidentally, an example of the robot control which can be executed by the CPU 601 of the controlling apparatus 91 will be described in Exemplary Embodiment 3 which will be described later.

As has been described above, in the present exemplary embodiment, the cable reactive force measuring units 931 to 936 are provided on the rotational joints 11, 21, 31, 41, 51 and 61, respectively. In addition, the controlling apparatus 91 can execute the correcting computations of correcting the outputs of the torque sensors 12 to 62 which measure the driving torques of the joints, by using the outputs of the cable reactive force measuring units 931 to 936, respectively.

In the conventional torque control of the rotational joint of the robot apparatus, the torque control has been performed which detects the driving torque value by installing the torque sensor in the joint, and feeds the detected driving torque value back to the motor control of the corresponding joint, in order to enhance the torque controllability. In such a torque control (servo), ideally, it is necessary that the measured values by the torque sensors 12 to 62 need to measure only the torques which the joints exert on the links. However, in the case where the cable 80 is arranged along the inside and the outside of the robot arm 1, there has been a problem that the cable reactive force generated by the deformation of the cable 80, which originates in the robot operation causes an error in the measured value of each of the torque sensors 12 to 62.

On the other hand, in the present exemplary embodiment, the robot apparatus measures the reactive force which is generated by the deformation of the cable, with each of the cable reactive force measuring units 931 to 936, corrects the torque value which has been measured by the torque sensor, and can feed back the value having a small error. Thereby, conventionally, the robot apparatus is enabled to perform the torque control of the joint, in a range of an infinitesimal force which has been impossible because of the error of the torque sensor, and is enabled to assemble minute components particularly having very light weights by operating the force (torque) control.

Thereby, the manufacture and assemble of the minute components are enabled, which has been conventionally impossible by a general-purpose multi-joint robot according to the force (torque) control method, without using a dedicated conventional apparatus which has been especially designed and manufactured.

In addition, the torque value which has been detected by the torque sensor that is arranged on the rotational joint can be occasionally used for suppressing the vibration of the robot arm. In the multi-joint robot arm, in particular, the vibration of the end effector 70 at the time when the robot apparatus has stopped from the state in which the robot apparatus is moving occasionally causes a problem. For instance, in a situation in which the position of the front end of the robot arm overshoots and the end effector interferes or comes in contact with another member, a waiting time spent until the vibration stops occasionally becomes a neck for shortening of the assembly time period.

In the above-described robot arm 1, the torque sensors 12, 22, 32, 42, 52 and 62 which are provided in each of the joints can be used for coping with this vibration problem. For instance, the robot apparatus can suppress the vibration of the robot arm 1, by measuring the torques which are generated in the corresponding joints by the torque sensors 12, 22, 32, 42, 52 and 62, and performing the control of driving the motors 92 which drive the corresponding joints, so as to cancel the torques.

According to the present exemplary embodiment, the robot apparatus can remove the cable reactive force as the disturbance, which is generated in each of the joints, from the output value of each of the torque sensors 12, 22, 32, 42, 52 and 62, due to the cable reactive force measuring units 931, 932, 933, 934, 935 and 936. Because of this, the robot apparatus can measure the value of the actual torque which is generated in the link that the corresponding joint supports, with extremely high precision, and can greatly enhance the performance of suppressing the vibration, by feeding the actual torque value back to the suppression of the vibration of the robot.

Exemplary Embodiment 2

As for the cable reactive force measuring unit which is arranged on the rotational joint of the robot arm 1, a different structure is considered. Also in the present exemplary embodiment, the configuration of the control system of the robot apparatus shall be similar to that illustrated in FIG. 4 and FIG. 9 in the above-described Exemplary Embodiment 1. In addition, in the present exemplary embodiment and an exemplary embodiment which will be described later, the members which are same as or equivalent to those in the above-described Exemplary Embodiment 1 are designated by the same (or similar) reference characteristics below, and the detailed description will be omitted.

(Arrangement of Force Sensor)

Figure 5:
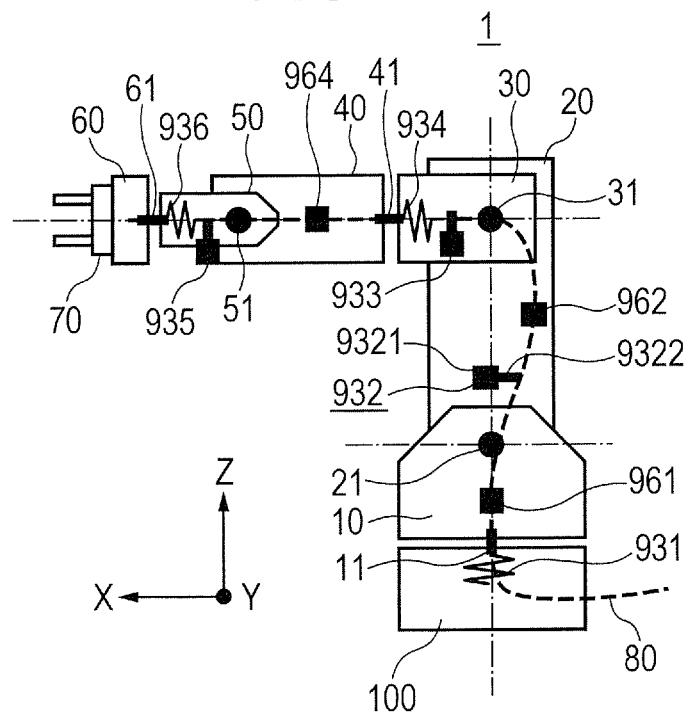
FIG. 5 is an explanatory view illustrating sites at which force sensors are installed, in a robot apparatus of Exemplary Embodiment 2.

FIG. 5 illustrates the structure of the robot arm 1, and the cable reactive force measuring units 931 to 936 which are arranged on the respective rotational joints 11, 21, 31, 41, 51 and 61, in the present exemplary embodiment.

In the present exemplary embodiment, the structures of the cable reactive force measuring units 931, 934 and 936 which are provided on the respective rotational joints 11, 41 and 61 that have each a structure coaxial with the links shall be similar to those which have been described in the above-described Exemplary Embodiment 1. The deformation members (82) of these cable reactive force measuring units 931, 934 and 936 are installed so as to be torsionally deformed on the same axes as the respective joint axes, by the cable reactive force which is generated due to the deformation of the cable 80.

On the other hand, the cable 80 is fixed to the links 10, 20 and 40 at the approximately middle positions of these links by cable clamps 961, 962 and 964 and the like, and thereby is arranged along the robot arm 1. Incidentally, portions at which the cable 80 is fixed by these cable clamps may be arbitrary places other than the above-described portions, as long as the portion is a place at which the cable does not interfere with the movement of the robot arm 1, and does not cause such problems as a break in the cable, which may occur because of an excessive tension exerted on the cable 80.

In addition, in the present exemplary embodiment, the structures of the cable reactive force measuring units 932, 933 and 935 are different from those in the above-described Exemplary Embodiment 1, which are arranged on the rotational joints 21, 31 and 51 that are arranged so as to control the relative angle formed by the central axes of the links on both sides. In the present exemplary embodiment, the cable reactive force measuring units 932, 933 and 935 are installed at positions other than those on the same axes as the rotating axes of the rotational joints 21, 31 and 51.

Incidentally, at the positions of the cable reactive force measuring units 931, 934 and 936, the cable 80 needs to pass through the inside of the link as has been described above. Then, it is considered to arrange the cable 80 so as to sew the inside and the outside of the robot arm 1, for instance, according to a mode which will be illustrated in the following.

As for the cable reactive force measuring unit 931, for instance, the cable 80 is arranged so as to pass through the base 100 and the inside of the link 10, and be led to the outside from the inside of the link 10 through an open hole (unillustrated) provided on the link 10 in the vicinity of the cable clamp 961.

In addition, as for the cable reactive force measuring unit 934, the site of the cable 80, which is closer to the front end side of the arm than the site at which the cable 80 is cramped by the cable reactive force measuring unit 933, is introduced to the inside of the link 30 through an open hole (unillustrated) which is provided on the link 30, and is passed through the cable reactive force measuring unit 934. Then, the cable 80 is led again to the outside of the link 40 through an open hole (unillustrated) which is provided on the link 40, and the tip thereof is held by the cable clamp 964. The cable 80 is supported by the cable reactive force measuring unit 935 at the site in the front, is introduced into the inside of the link 50 again through an open hole (unillustrated) which is provided on the link 50, and is passed through the cable reactive force measuring unit 936.

The structures of the cable reactive force measuring units 931, 934 and 936 are similar to those which have been illustrated in Exemplary Embodiment 1, but on the other hand, the structures of the cable reactive force measuring units 932, 933 and 935 are different from those in Exemplary Embodiment 1. The structures of these cable reactive force measuring units 932, 933 and 935 will be described below with reference to an example of the cable reactive force measuring unit 932, but the structure of the cable reactive force measuring unit 932 shall be similar to those of the cable reactive force measuring units 933 and 935.

The cable reactive force measuring unit 932 is formed of a basal part 9321, and a sensor unit 9322 which fixes the cable 80 thereon and constitutes the detecting unit for the cable reactive force (FIG. 5). In the basal part 9321 of the cable reactive force measuring unit 932 is a base part which is fixed to the link 20, and the bracket-like sensor unit 9322 is supported at the front end of the basal part 9321 in a state of being separated from the surface of the link 20, for instance.

The structure of the sensor unit 9322 may be approximately the same as the structure formed of the cable fixing member 81 and the deformation member 82 which are illustrated in FIG. 2. The cable fixing member 81 holds the cable 80 in a direction which intersects with the longitudinal direction of the deformation member 82 and the cable fixing member 81, similarly to the case (FIG. 2) of the cable reactive force measuring unit 932 which has been described in Exemplary Embodiment 1. The deformation member 82 is structured from an elastically deformable material such as a resin, similarly to the case of Exemplary Embodiment 1.

The site which has been illustrated as the link 20 in FIG. 2 is replaced with the basal part 9321, in the case of the cable reactive force measuring unit 932 of the present exemplary embodiment.

In addition, according to the arrangement of the cable reactive force measuring unit 932 in the present exemplary embodiment, the deformation member 82 can detect components of forces, for instance, in three directions, as in the following description. For this purpose, a plurality of sensors 83 (for instance, distortion gauge and the like), which detect the deformation of the deformation member 82 in the corresponding direction, can be arranged on the deformation member 82, so as to be capable of detecting the components of forces in the following plurality (3) of directions.

Due to the above-described structure, any of the cable reactive force measuring units 932, 933 and 935 can measure the forces in the three directions. In order to facilitate understanding, the components of these three forces will be described according to the directions of three-dimensional coordinates, only for the position and orientation of the robot arm 1 in FIG. 5. Specifically, a first force is a translation force in the X-direction, a second force is a translation force in the Z-direction, and a third force is a torsional force (torque) around the Y-axis.

According to the present exemplary embodiment, the cable reactive force measuring units 932, 933 or 935 having different structures from those in Exemplary Embodiment 1, in particular, can measure the cable reactive forces of the cable 80, which include the components of the forces at least in the three directions as having been described above. Because of this, the robot apparatus can measure a more complicated cable reactive force which is generated by the more complicated deformation of the cable 80, and can feed back the result to the control of the robot arm 1.

In addition, the cable reactive force measuring units 932, 933 and 935 can be attached to a place other than the rotating axis of the rotational joint. Then, a degree of freedom of a path increases through which the cable 80 is wired. Thereby, the robot apparatus can select the place as the path, at which a trouble such as a break in the cable 80 is easily avoided, and can enhance the reliability of itself.

In addition, the degree of freedom of the path of the cable 80 increases, and thereby the robot apparatus can select the path of the cable so that, for instance, the size of the substantial contour of the robot arm 1 including the site and the like of the warped cable 80 becomes small. Thereby, the size of the robot apparatus can be made compact. Generally, the joint site of this type of vertical multi-joint robot apparatus has a plurality of mechanical elements such as a motor and a speed reducer arranged therein, and is a place of which the size becomes easily large. If the cable reactive force measuring unit is further installed in the joint site, it becomes considerably difficult to reduce the size and the weight of the joint site. On the other hand, if, as in the case of the cable reactive force measuring units 932, 933 and 935, the measuring units can be mounted on sites other than the rotational joints, the structures of the joint sites, in particular, can be simplified, and thereby the size and the weight of the whole robot apparatus can be reduced.

Exemplary Embodiment 3

Figure 7:
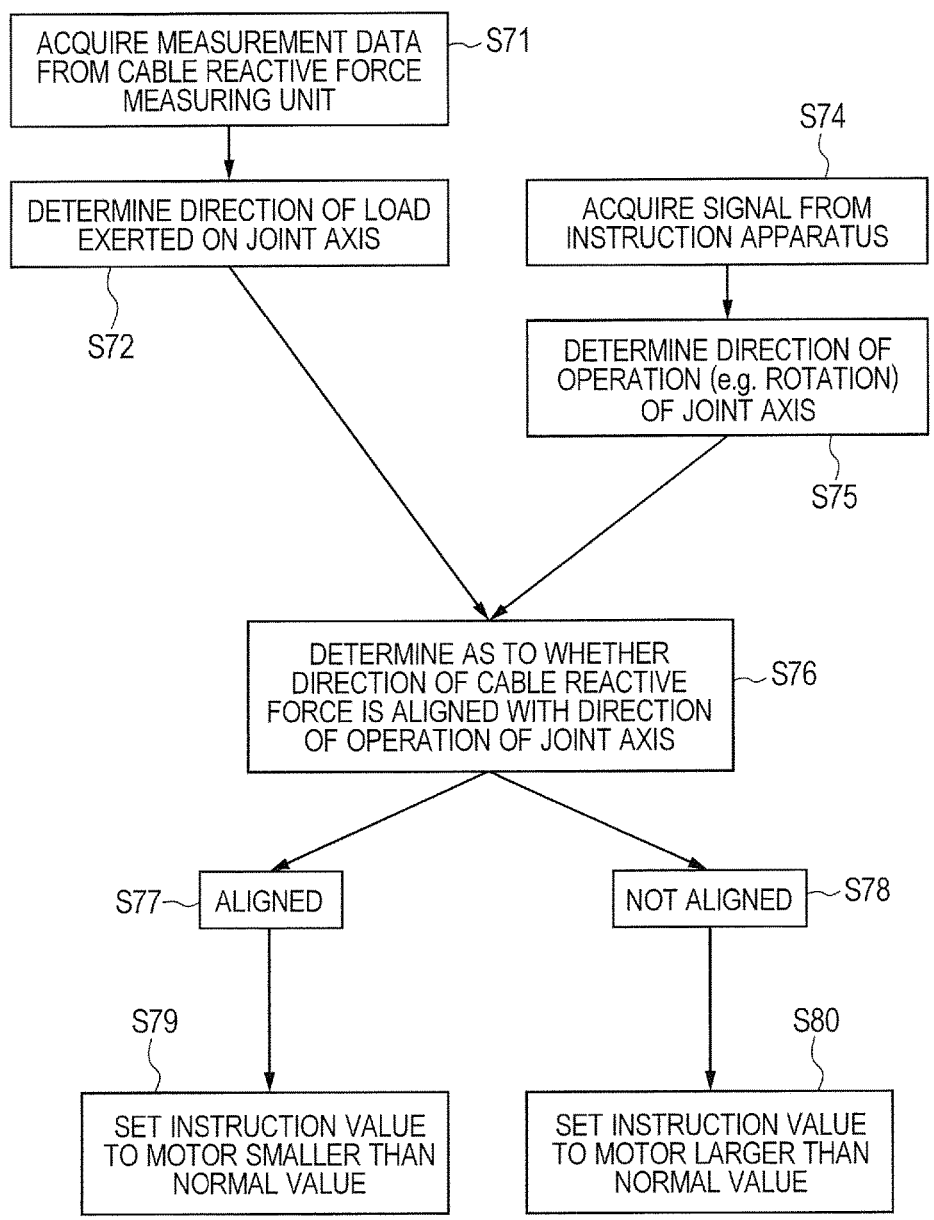
FIG. 7 is a flow chart illustrating a robot control in the robot apparatus of Exemplary Embodiment 1.

In the present exemplary embodiment, some examples of a robot control procedure (robot control program) are illustrated which can be executed by the CPU 601 of the above-described controlling apparatus 91. FIG. 7 and FIG. 8 illustrate a flow of the robot control procedure (robot control program) which can be executed by the CPU 601 of the controlling apparatus 91. A control example in FIG. 7 is an example of correcting instruction values for driving the rotational joints sent from the instruction apparatus 94, according to the cable reactive forces which have been measured by the cable reactive force measuring units 931, 932, 933, 934, 935 and 936. In addition, the control example in FIG. 8 is an example of correcting the torque control which feeds back the output values of the torque sensors 12, 22, 32, 42, 52 and 62, according to the cable reactive forces which have been measured by the cable reactive force measuring units 931, 932, 933, 934, 935 and 936. The controls in FIG. 7 and FIG. 8 are simplified and illustrated in a form of the control concerning one particular rotational joint, so as to facilitate understanding. The controls illustrated in FIG. 7 and FIG. 8 can be stored, for instance, in the ROM 602 or the like, as a part of the robot program which the CPU 601 executes.

The control in FIG. 8 (or also in FIG. 7 similarly), in particular, relates to a control that uses the output values of the torque sensors 12, 22, 32, 42, 52 and 62 which measure the driving torques of the rotational joints. Because of this, detected values that have been detected in the cable reactive force measuring units 931, 932, 933, 934, 935 and 936 which are arranged, for instance, as in Exemplary Embodiment 1, and measure the cable reactive forces around the rotating axes of the rotational joints, can be used for the values of the cable reactive forces, which are used for the torque control. However, also for such a structure as the cable reactive force measuring units 932, 933 and 935 in Exemplary Embodiment 2, the control in FIG. 8 (also in FIG. 7 similarly) can be performed, in the case where the torque (force) around the axis of the rotational joint can be acquired through appropriate computation.

The instruction apparatus 94 shall be capable of transmitting the instruction values concerning the positions or the positions and orientations of the rotational joints 11, 21, 31, 41, 51 and 61 in the robot arm 1, to the controlling apparatus 91. Here, the control in FIG. 7 is illustrated as the control concerning one joint, but when receiving the instruction value from the instruction apparatus 94, the controlling apparatus 91 transmits the instruction value for controlling the drive of the corresponding joint, to the motor 92 of the corresponding joint, according to the received instruction value.

In FIG. 7, when the CPU 601 has received, in step S74, the instruction value concerning the drive control of the rotational joint concerning the control of FIG. 7, from the instruction apparatus 94, the CPU 601 determines, in step S75, the rotation direction of the rotational joint (any one of above-described rotational joints) concerning the received instruction value. As for this type of instruction value which is used for the control of the rotational joint, in particular, as for an instruction value concerning the rotation angle, the instruction value, for instance, concerning a specific rotation direction of the rotational joint is expressed by a positive symbol (+), and an instruction value concerning an inverse rotation direction is expressed by a negative symbol (−). Then, by interpreting the symbol and the like of the instruction value which the CPU 601 has received in step S74, for instance, the CPU 601 can determine as to whether the rotation direction of the rotational joint corresponding to the instruction value is the positive symbol (+) or the negative symbol (−) (or positive direction or reverse direction).

At the same time, the CPU 601 acquires, in step S71, the measured value of the cable reactive force output from the cable reactive force measuring unit which is provided on the rotational joint that relates to the control of FIG. 7. Furthermore, the CPU 601 determines, in step S72, a direction of the load of the cable 80 supported by the corresponding joint, based on the measured value (for instance, symbol thereof) which has been output from the cable reactive force measuring unit. The CPU 601 can execute: the input/output to/from the cable reactive force measuring unit and the determination of the load direction, in steps S71 and S72; and the input/output to/from the instruction apparatus 94 and the determination of the direction of the operation, in steps S74 and S75, in parallel, for instance, by using a hardware interrupt.

For instance, in the case of the cable reactive force measuring unit 932 which is structured as is illustrated in FIG. 2, the cable reactive force measuring unit 932 can measure the cable reactive force which originates in the deformation of the cable 80 and is applied to the rotational joint axis that is connected rigidly to the link 20 which is supported by the rotational joint 21. This cable reactive force (load) also has naturally a rotation direction of a positive symbol (+) or a negative symbol (−) (or positive direction or reverse direction), similarly to the rotation direction of this joint. The CPU 601 detects this rotation direction through the deformation direction of the deformation member 82 or the sensor 83 of the cable reactive force measuring unit 932, in step S72.

In step S76, the CPU 601 determines as to whether or not the direction of the operation of the rotational joint concerning the instruction value of the instruction apparatus 94, which has been specified in each of steps S75 and S72, is aligned with the direction of the cable reactive force, which has been specified by the cable reactive force measuring unit concerning the corresponding joint.

When both of the directions are aligned (S77), the cable reactive force results in assisting the driving force of the motor (92) which drives the corresponding joint. In this case, the process proceeds to step S79, and the CPU 601 performs the correction of decreasing the instruction value that is transmitted to the motor (92) of the corresponding joint in response to the command of the instruction apparatus 94, by the amount according to the size of the cable reactive force.

On the other hand, in the case where both of the directions are not aligned (S78) in step S76, the result means that the cable reactive force acts in a direction of resisting the driving force of the motor (92) that drives the corresponding joint. In this case, the process proceeds to step S80, and the CPU 601 performs a correction of increasing the instruction value which is transmitted to the motor (92) of the corresponding joint in response to the command of the instruction apparatus 94, by an amount according to the size of the cable reactive force.

On the other hand, FIG. 8 illustrates a control example of the case where the CPU 601 makes the cable reactive forces which have been measured by the cable reactive force measuring units 931, 932, 933, 934, 935 and 936 work on the torque control using the output values of the torque sensors 12, 22, 32, 42, 52 and 62. In the control of FIG. 8, the instruction value of the rotational joint concerning the control procedure illustrated in FIG. 8 is determined, based on the previously-prepared robot control program (unillustrated); and the CPU 601 shall send the instruction value to the motor (92), and execute the processing (unillustrated) of driving the corresponding joint, in parallel.

In step S83 in FIG. 8, the CPU 601 acquires the measurement data of the torque sensor (any one of 12, 22, 32, 42, 52 and 62) which is provided on the rotational joint and is associated with the control of FIG. 8, and determines the rotation direction of the corresponding joint in step S84. In the determination of the rotation direction in step S84, the CPU 601 may use (symbol of) the instruction value of the motor 92 of the corresponding joint, which is separately generated by the above-described control, or may also use the symbol of the output value of the torque sensor concerning the corresponding joint.

On the other hand, in step S81, the CPU 601 acquires the measured value of the cable reactive force, which is output from the cable reactive force measuring unit that is provided on the rotational joint which relates to the control of FIG. 8. Furthermore, in step S82, the CPU 601 determines the direction of the load of the cable 80 which is supported by the corresponding joint, based on the measured value (for instance, symbol thereof) which has been output from the cable reactive force measuring unit. The CPU 601 can execute: the input/output to/from the cable reactive force measuring unit and the determination of the load direction, in steps S81 and S82; and the input/output to/from the instruction apparatus 94 and the determination of the direction of the operation, in steps S83 and S84, in parallel, for instance, by using a hardware interrupt.

In step S86, the CPU 601 determines as to whether or not the direction of the operation of the rotational joint, which has been specified in each of steps S84 and S82, is aligned with the direction of the cable reactive force, which has been specified by the cable reactive force measuring unit concerning the corresponding joint, similarly to the process in step S76 in FIG. 7.

When both of the directions are aligned (S87), the torque sensor concerning the corresponding joint results in outputting a value containing the cable reactive force which has been measured by the cable reactive force measuring unit concerning the corresponding joint. In other words, the joint driving torque which the motor (92) of this joint actually generates should be smaller than the value that is detected by the torque sensor. In this case, the process proceeds to step S89, and in order to compute a true (actual) joint driving torque, the CPU 601 performs the correction of subtracting the value of the cable reactive force that has been measured by the cable reactive force measuring unit concerning the corresponding joint, from the output value of the torque sensor concerning the corresponding joint.

On the other hand, when both of the directions are not aligned (S88) in step S86, the torque sensor concerning the corresponding joint results in outputting a value in which the amount of the cable reactive force that has been measured by the cable reactive force measuring unit concerning the corresponding joint has been subtracted. In other words, the joint driving torque which the motor (92) of this joint actually generates should be larger than the value that is detected by the torque sensor. In this case, the process proceeds to step S90, and in order to compute a true (actual) joint driving torque, the CPU 601 performs the correction of adding the value of the cable reactive force that has been measured by the cable reactive force measuring unit concerning the corresponding joint, to the output value of the torque sensor concerning the corresponding joint.

Subsequently, in step S91, the CPU 601 computes the instruction value of the joint driving torque, which is given to the motor (92) of the corresponding joint, by using the true (actual) joint driving torque in which the output value of the torque sensor has been corrected by the amount of the cable reactive force in steps S89 and S90. One of the objects of the torque control computation in step S91 is considered, for instance, to restrict the torque and the like in the case where a minute component (work) and the like are handled by the end effector 70, as has been described above. In this case, for instance, the CPU 601 computes the instruction value so that the driving torque of the corresponding joint does not exceed the predetermined value. In the torque control computation in step S91, the CPU 601 can perform also the instruction value computation for suppressing the vibration of the robot arm 1, as has been described above.

In step S92, the CPU 601 transmits the instruction value which has been obtained as a result of the torque control computation in step S91, to the motor (92) of the corresponding joint.

As in the above description, the control system can drive and control the motor (92) which functions as the driving source that drives the corresponding joint, based on the values of the reactive forces of the cable (80), which have been measured by the cable reactive force measuring units (931 to 936) that are provided on the rotational joints (11 to 61), as is illustrated in FIG. 7 and FIG. 8. As has been described above, the cable reactive force measuring units (931 to 936) can be structured so as to detect (only) the cable reactive force of the cable (80).

Because of this, in the control in FIG. 7, the CPU 601 can correct the instruction value for the motor (92) which functions as the driving source of the corresponding joint, according to a relationship between the direction of the cable reactive force of the cable (80) that has been measured by each of the cable reactive force measuring units (931 to 936), and the direction of the operation of the corresponding joint. For instance, the CPU 601 can correct the instruction value for the motor (92) which functions as the driving source of the corresponding joint, according to whether the cable reactive force assists the joint action of the corresponding joint or resists the joint action.

In addition, in the control in FIG. 8, the CPU 601 removes the component of the cable reactive force of the cable (80), which is contained as the disturbance in the value of the rotational driving torque that has been detected by the torque sensors (12 to 62) provided on the rotational joints (11 to 61), and can detect the true (actual) value of the rotational driving torque. As in the above description, the cable reactive force measuring units (931 to 936) can be structured so as to detect (only) the cable reactive force of the cable (80), and accordingly enables such a torque control. In addition, the CPU 601 can precisely correct the instruction value for the motor (92) which functions as the driving source of the corresponding joint so that the correction conforms to the purpose of the force (torque) restriction, the vibration suppression and the like, by using the true (actual) value of the rotational driving torque, in which the component of the cable reactive force has been removed.

As has been described above, the robot apparatus can arrange the cable reactive force measuring units (931 to 936) which measure the cable reactive force that is generated by the deformation of the cable (80), regarding the cable (80) that functions as the wire member which transmits the driving signal at least to the driving source of the rotational joint of the robot arm (1). The cable reactive force measuring units (931 to 936) function as the force sensor which measures (only) the reactive force that is applied to the rotational joint when the cable (80) is deformed due to the robot action. Because of this, the robot apparatus can perform the highly precise robot control containing the position control and the torque control, by feeding the cable reactive force which has been measured by each of the cable reactive force measuring units (931 to 936) back to the driving control of the motor (92) that functions as the driving source of the rotational joint. In other words, the robot apparatus measures the reactive force of the cable (80) which is a wire member that is used for the transmission of the driving signal with the joint (or end effector) of the robot apparatus, by the cable reactive force measuring units (931 to 936), and can perform the highly precise robot control by using the measured value.

Incidentally, in the case where the robot apparatus feeds the rotational driving torque which has been measured by each of the torque sensors 12 to 62 arranged on the respective rotational joints 11 to 61, back to the instruction value for the action of the motor 92, it is also considered that the robot apparatus feeds the rotational driving torque not only to the force (torque) control as described above but also to the position control. For instance, it is considered that the robot apparatus detects the position deviation of the end effector 70 of the robot arm 1, based on the rotational driving torque which has been measured by each of the torque sensors 12 to 62, and feeds the detected position deviation back to the driving amount (position control command) of the motor 92 according to the position deviation. Thus, the robot apparatus has an effect of enhancing the position precision of the end effector 70. Incidentally, in the case where the robot apparatus feeds the rotational driving torque which has been measured by each of the torque sensors 12 to 62, back to the position control command to the motor 92, methods are considered by which the robot apparatus performs the control of adjusting the position (for instance, rotation angle) that is commanded as the instruction value of the action, and the control of changing the gain of the position command.

(Modified Example and the Like)

In each of the above-described exemplary embodiments, a vertical multi-joint robot arm having a serial link structure of six axes is illustrated, but the number of the joints and the structure of the link are not limited to the above-described structure. For instance, the robot arm may be structured of a multi-joint of seven axes or a fewer number of the joints. In addition, also in a robot arm having a multi-joint horizontal structure, and a robot arm having a parallel link structure, the structure and the control which are similar to those in the above description can be carried out. In this case, the cable reactive force measuring unit measures the reactive force which is generated when the wire member is deformed that functions as the transmission member of the driving signal, and feeds back the measured reactive force, in a similar way to that in the above description. Thereby, the robot apparatus can enhance its force controllability and/or the position controllability.

In addition, in the above description, a structure has been illustrated in which the motor (92) and the speed reducer are used as the driving system that drives the (rotational) joint. However, also in the structure in which a hydraulically (or pneumatically) driven actuator is used for the (rotational) joint driving, the torque sensor and the cable (wire member) reactive force measuring unit which are similar to those in the above description can be arranged, and the robot control can be performed with the use of these units. In this case, the cable (80) which transmits the electric signal that has been described above is replaced with a wire member such as a flexible pressure tube, as needed.

Figure 6:
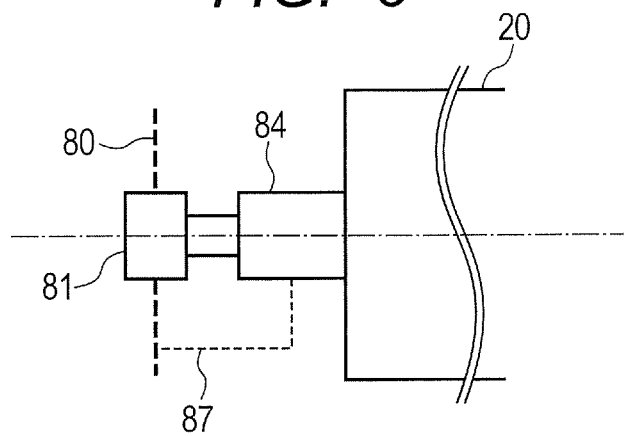
FIG. 6 is an explanatory view illustrating a structure of the cable reactive force measuring unit in the robot apparatus of Exemplary Embodiment 1.

Incidentally, in FIG. 2 of Exemplary Embodiment 1, a structure which is formed of the cable fixing member 81, the deformation member 82 and the sensor 83 is explicitly illustrated, as a structure of the cable reactive force measuring unit (932). However, the cable reactive force measuring unit may be structured of a load sensor 84, for instance, as is illustrated in FIG. 6, in which the deformation member 82 is integrated with the sensor 83 in FIG. 2. This load sensor 84 is formed of the deformation member 82 which has the sensor 83 contained or embedded therein, as is illustrated in FIG. 2; and the cable fixing member 81 is mounted on the front end, and a cable 87 for outputting the measured value is led out from the surface. Thus, the design of the specific structure of the cable reactive force measuring unit can be arbitrarily changed by a person skilled in the art. In addition, the design also concerning the place at which the cable reactive force measuring unit is installed can be arbitrarily changed by a person skilled in the art, and the place can be arbitrarily changed to another position than the position which has been illustrated in the above-described exemplary embodiments, as long as the position is a position at which the cable reactive force can be measured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087294, filed Apr. 22, 2015, which is hereby incorporated by reference herein in its entirety.

What is claimed is:

1. A robot apparatus provided with a first link, a second link, a joint which connects the first link and the second link to each other, a driving source which drives the joint, a wire member which is arranged along the first link or the second link, and a controlling apparatus which controls the driving source, comprising:
the wire member, attached to the first link or the second link through a deformation member, to transmit a driving signal at least to the driving source; and
a first sensor for measuring a deformation amount of the deformation member when the deformation member is deformed by deformation of the wire member due to driving of the joint by the driving source,
wherein the controlling apparatus drives and controls the driving source, based on a value of the deformation amount measured by the first sensor.

2. The robot apparatus according to claim 1, wherein:
the joint is a rotational joint and the driving source is a rotational driving source;
the joint has a second sensor for determining a rotational driving torque of the joint; and
the controlling apparatus executes a torque control of controlling a rotational driving torque of the driving source, based on a value determined by the second sensor, and on the value measured by the sensor.

3. The robot apparatus according to claim 1, wherein the first sensor is installed on a rotating axis of the joint.

4. The robot apparatus according to claim 1, wherein the driving signal which is transmitted through the wire member is an electric signal.

5. The robot apparatus according to claim 1, wherein the wire member is installed in an outside or an inside of the first link or the second link.

6. The robot apparatus according to claim 1, wherein a plurality of the first sensors are provided, and the joint is arranged between the plurality of the first sensors.

7. An end effector capable of being mounted on a robot arm included in a robot apparatus provided with a first link, a second link, a joint which connects the first link and the second link to each other, a driving source which drives the joint, a wire member which is arranged along the first link or the second link, a controlling apparatus which controls the driving source, the wire member being attached to the first link or the second link through a deformation member, to transmit a driving signal at least to the driving source, and a first sensor for measuring a deformation amount of the deformation member when the deformation member is deformed by deformation of the wire member due to driving of the joint by the driving source, wherein the controlling apparatus drives and controls the driving source, based on a value of the deformation amount measured by the first sensor, the end effector comprising:
a connection member for mounting the end effector to one of the first link or the second link; and
a wire connection member for connecting the wire member to the end effector,
wherein the end effector is connected to the wire member when the end effector is mounted to the first link or second link on the robot arm.

8. A robot controlling program stored on a non-transitory computer-readable storage medium, the program for operating a controlling apparatus to execute controlling of a robot apparatus provided with a first link, a second link, a joint which connects the first link and the second link to each other, a driving source which drives the joint, a wire member which is arranged along the first link or the second link, and the controlling apparatus which controls the driving source, the wire member being attached to the first link or the second link through a deformation member, to transmit a driving signal at least to the driving source, and a first sensor for measuring a deformation amount of the deformation member when the deformation member is deformed by deformation of the wire member due to driving of the joint by the driving source, the program comprising:
code for measuring the deformation amount of the deformation member when the deformation member is deformed by deformation of the wire member due to the driving of the joint by the driving source; and code for the controlling apparatus to drive and control the driving source, based on a value of the deformation measured by the first sensor.

9. A non-transitory computer-readable recording medium storing a readable robot controlling program operating a controlling apparatus to execute controlling of a robot apparatus provided with a first link, a second link, a joint which connects the first link and the second link to each other, a wire member arranged along the first link or the second link, a driving source which drives the joint, the controlling apparatus which controls the driving source, the wire member being attached to the first link or the second link through a deformation member, to transmit a driving signal at least to the driving source, and a first sensor for measuring a deformation amount of the deformation member when the deformation member is deformed by deformation of the wire member due to driving of the joint, the program comprising:

code for measuring the deformation amount of the deformation member when the deformation member is deformed by the deformation of the wire member due to driving of the joint by the driving source; and code for the controlling apparatus to drive and control the driving source, based on a value of the deformation amount measured by the first sensor.

10. A controlling method of a robot apparatus provided with a first link, a second link, a joint which connects the first link and the second link to each other, a wire member arranged along the first link or the second link, a driving source which drives the joint, a controlling apparatus which controls the driving source, the wire member being attached to the first link or the second link through a deformation member, to transmit a driving signal at least to the driving source, and a sensor for measuring a deformation amount of the deformation member, the controlling method comprising:

measuring, executed by the controlling apparatus, to operate the sensor to measure the deformation amount of the deformation member when the deformation member is deformed by deformation of the wire member due to driving of the joint by the driving source; and driving and controlling, executed the controlling apparatus, to operate the driving source to drive the joint, based on a value of the deformation amount measured in the measuring by the sensor.

* * * * *